June 12, 1934.   C. G. ATWATER   1,962,116
APPARATUS FOR FERTILIZING SOIL
Filed Aug. 20, 1930
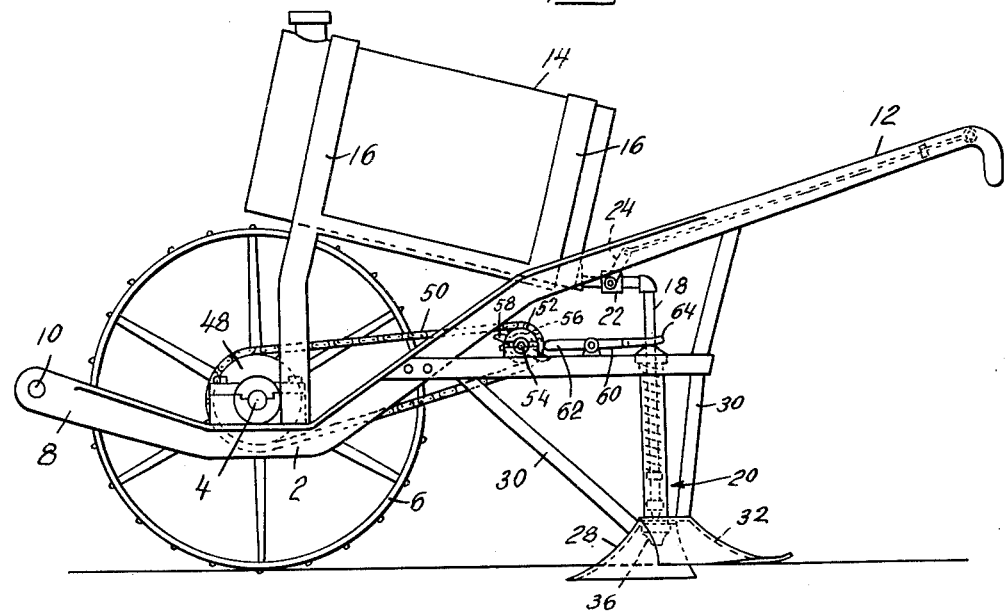
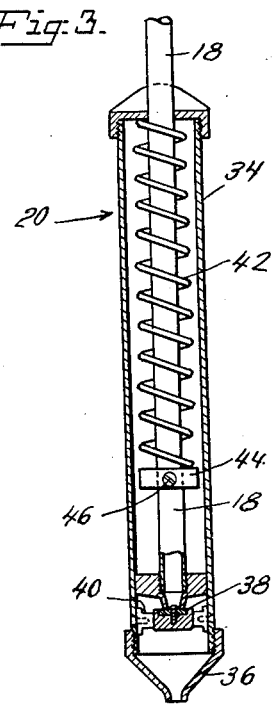
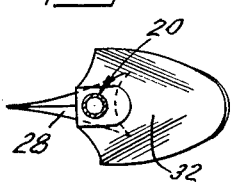
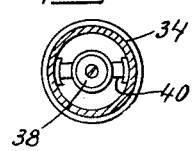
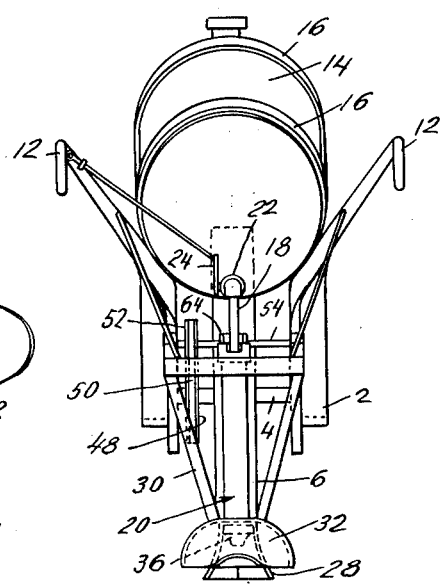
INVENTOR
Christopher G. Atwater
BY
ATTORNEY Patented June 12, 1934

1,962,116

UNITED STATES PATENT OFFICE 1,962,116

APPARATUS FOR FERTILIZING SOIL

Christopher G. Atwater, Tarrytown, N. Y., assignor to The Barrett Company, New York, N. Y., a corporation of New Jersey Application August 20, 1930, Serial No. 476,543

6 Claims. (Cl. 111—7)

My invention relates to methods and means for applying liquid or fluid fertilizing materials to soil and particularly to the use and application of liquid fertilizers consisting of or containing volatile constituents such as ammonia.

Fertilizers and soil amendments are ordinarily applied in granular, powdered or other substantially dry form either by hand or by implements designed to handle dry or solid materials. Such fertilizers often contain salts of ammonia such as crystalline ammonium sulfate with or without other ingredients such as phosphates, potash, lime, fillers, etc. Although aqua ammonia and solutions or slurries of materials having valuable fertilizing or soil treating properties can be readily prepared or obtained/they have not been widely used as fertilizers. Such liquid or fluid fertilizers and especially aqua ammonia, if applied in the manner of ordinary fertilizers, by distribution broadcast over the soil, would suffer substantial loss of valuable constituents by vaporization of volatile ingredients thereof such as free ammonia. Furthermore, when liquids are applied to soil they tend to run off into depressions or puddles so that they are unevenly distributed over the soil.

Among the objects of my invention are to provide a new means for applying liquid or fluid fertilizers to soil, to prevent or reduce the loss of volatile constituents of the fertilizer and to distribute the fertilizer uniformly to the desired portions of the soil.

My invention may be employed generally for applying liquid and semi-liquid fertilizers and soil amendments such as aqua ammonia, solutions of salts, slurries of lime and other fertilizing materials. All such materials will be hereinafter referred to as liquid fertilizers.

In practicing my invention, I may employ liquid fertilizer in the form of aqua ammonia or solutions of other materials in any desired strength, a solution of aqua ammonia of about 25% strength being preferred, since such a solution is the same in ammonia content per pound as ammonium sulfate salts. The liquid fertilizer is relatively volatile and therefore it is introduced below the surface of the soil or after being applied to the soil the fertilizer is immediately covered to reduce evaporation and loss of valuable constituents thereof and to prevent flow of the fertilizer from the point of application. Preferably, the soil to which the fertilizer is applied is first broken after which the fertilizer is applied to the freshly broken soil, and immediately thereafter covered with soil. The aqua ammonia may be continuously discharged onto or applied to the soil, or it may be applied intermittently at spaced intervals in a furrow or otherwise.

The implements or devices employed for applying the liquid fertilizer to the soil and for covering the fertilizer may be of any suitable type or construction, but I prefer to employ a device such as that illustrated in the figures of the accompanying drawing and hereinafter described.

In the drawing:

Fig. 1 is a side view of a preferred form of device for applying liquid fertilizer to soil;

Fig. 2 is a rear view of the form of device illustrated in Fig. 1;

Fig. 3 is an enlarged sectional view of a valve employed for controlling the discharge of fertilizer onto the soil;

Fig. 4 is a plan view of the soil breaking and covering means shown in Fig. 1; and Fig. 5 is a sectional view of the valve construction as shown in Fig. 3.

In the form of the invention illustrated in the figures of the drawing, the device comprises a frame 2 supported on the axle 4 of ground wheel 6 and extending on either side thereof rearwardly of the ground wheel. The forward end of the frame is provided with a member 8 having an aperture 10 therein, to which a swingle-tree or other suitable connecting means may be secured for hitching a horse or tractor to the device to draw it over the ground or along the row of plants to be fertilized. The rearward portion of the frame 2 extends upwardly at an angle and is provided with handles 12 for guiding the implement. A tank 14 for the liquid fertilizer is carried by the frame 2 and is secured thereto by the member 16. The tank is closed to prevent the escape of volatile constituents of the fertilizer, but is provided with a covered opening through which the liquid fertilizer is introduced. A pipe 18 connects with the lower portion of the tank 14 and extends downwardly therefrom to a point adjacent the ground to be fertilized. The lower end of the pipe 18 is provided with a valve 20 by means of which the flow of liquid fertilizer from the pipe 18 onto the soil is controlled. The pipe 18 may also be provided with a valve 22 which may be manually operated by means of a lever 24 to vary the rate of flow of liquid fertilizer from the tank to the valve 20 so that the amount of fertilizer applied to each acre of land fertilized may be varied at will. The tank 14 and pipe 18 are constructed of suitable corrosion-resisting materials such as sheet-iron, cast-iron or corrison-resisting alloy.

It is desirable that the soil onto which the liquid fertilizer is discharged will be in such condition that it will take up the fertilizer as soon as applied. It is also desirable that the fertilizer should be applied below the surface of the soil or in such a manner that it cannot readily escape or flow away. For this purpose the device is provided with a member for breaking the soil, such as the blade 28, which is secured to the frame 2 by means of the members 30. The blade 28 is preferably V-shaped as illustrated in Fig. 4, with the rearward portions thereof extending outwardly to form a furrow in the soil. The valve 20, secured to the lower end of the pipe 18, to control the discharge of liquid fertilizer onto the soil, is positioned between the outwardly-extending rearward portions of the blade 21. A leveling member 32 also carried by the members 30 is positioned directly behind the blade 28 and the valve 20 and extends outwardly beyond the rear portions of the blade 28 to move the soil displaced in forming the furrow back into the furrow to cover the liquid fertilizer discharged into the broken soil by the valve 20. The upper portion of the blade 28 and leveling member 32 extend around and close to the valve member 34 to prevent the ready escape of ammonia vapors or volatile constituents of the fertilizer into the air.

Any suitable type of valve or discharging device may be employed for discharging the liquid fertilizer from the pipe 18 onto the soil. The valve 20 shown in the drawing consists of a tubular member 34 which surrounds the lower portion of the pipe 18 and is provided at its lower end with a nozzle 36 which equalizes the flow of liquid fertilizer from the pipe 18 and effects an even distribution of the fertilizer onto the soil. The tubular member 34 carries the closure member 38 which, when in closed position, bears against the lower end of the pipe 18 to prevent the discharge of liquid fertilizer therefrom. The member 38 is secured in place in the tubular member 34 by the support 40 as illustrated in Fig. 5. The closure member 38 is normally held in contact with the lower end of the pipe 18 by means of the spring 42 which bears against the upper end of the tubular member 34 and against a collar 44 secured to the pipe 18 by the screw 46.

The nozzle 36 is removably secured to the end of the tubular member 34 so that nozzles having larger or smaller discharge openings may be employed to allow the liquid fertilizer to flow slowly or rapidly from the nozzle, as desired, and to effect the discharge of fertilizer intermittently at predetermined spaced intervals, or in a substantially continuous stream evenly distributed over the soil.

The valve 20 is operated to discharge liquid fertilizer from the valve 18 by depressing the tubular member 34 against the action of the spring 42, thus moving the closure member 38 downwardly away from the lower end of the pipe 18. When so depressed, liquid fertilizer flows from the pipe 18 through the nozzle 36 which distributes the fertilizer over the broken soil as desired. Preferably, the member 34 is depressed intermittently to allow relatively small amounts of liquid fertilizer to flow into the nozzle from which it is discharged onto the soil continuously or at spaced intervals, depending upon the size of the discharge opening of the nozzle 36, as the device is moved over the ground. The means for depressing the member 34 to allow fertilizer to flow from the pipe 18 is shown as comprising a driving member 48 such as a sprocket or pulley secured to the axle 4 of the ground wheel 6. A chain or belt 50 is passed around the driving member 48 and over a sprocket or pulley 52 secured to a rotatable shaft 54. A cam member 56 is mounted on the shaft 54 to rotate therewith and is provided with a plurality of actuating cams 58 which engage the pivoted lever 60 during rotation of the cam member. The actuating cams 58 thus raise the forward end 62 of the pivoted lever and depress the rearward bifurcated end 64 of the lever which bears against the upper end of the tubular member 34. Rotation of the ground wheel thus actuates the valve member 20 to effect the discharge of liquid fertilizer onto the soil. The valve 20 is actuated one or more times during each rotation of the cam member 56, depending upon the number and spacing of the actuating cams 58. The arrangement and shape of the actuating cams 58 may be varied as desired to effect the desired rate of application of fertilizer per acre and to adapt the device for use with different fertilizers or solution of different concentration.

The operation of the device is as follows: The tank 14 is supplied with liquid fertilizer such as aqua ammonia of 25% strength and the device is moved over the field or along rows of plants to be fertilized. The ground wheel 6 which carries the frame 2 rotates as it moves over the ground rotating the driving member 48 which in turn drives the chain 50 to rotate the cam member 56. The actuating cams 58, secured to the cam member 56, raise the adjacent end 62 of the pivoted lever 60 thereby depressing the bifurcated rearward end 64 of the lever 60 and the tubular valve member 34. The closure member 38 is thus moved downwardly away from the lower end of the pipe 18 which delivers the liquid fertilizer from the tank 14 into the nozzle 36 from which it is discharged and distributed evenly or intermittently over the soil. As the device is moved forward, the blade 28 cuts a furrow in the soil into which the liquid fertilizer is discharged from the nozzle 36. The member 32 immediately thereafter moves the soil displaced by the blade 28 back into the furrow covering the liquid fertilizer and preventing its evaporation or escape.

The frequency of operation of the valve 20 may be altered at will either by varying the number of actuating cams 58 or by changing the size of the sprockets 48 and 52. The amount of fertilizer applied per acre may also be controlled in this way or by using a larger or smaller nozzle 36. The amount of fertilizer applied per acre may also be controlled without adjustment of the apparatus by varying the concentration of the solution of liquid fertilizer employed. The rate at which the liquid fertilizer passes from the tank 14 to the valve 20 may be controlled by the manual operation of the valve 22 which also serves as a shut-off valve.

Although the device illustrated is provided with a single valve 20 for controlling the discharge of fertilizer onto the soil the invention may be embodied in other constructions provided with a branched pipe 18 conducting liquid fertilizer from one or a plurality of tanks to several valves 20 and furrowing devices for applying fertilizer to two or several rows of plants or at laterally spaced points on the soil.

Although I have shown and described a preferred type of mechanism for applying liquid fertilizer to the soil, my invention is not limited to the use of this particular type of device and my method of fertilizing the soil may be carried out by the use of different types of mechanism without departing from the invention as defined by the claims. The term "stream" as used throughout the specification and claims is intended to refer to a body of liquid being poured onto the soil to be treated as distinguished from a spray of atomized liquid intermingled with air.

I claim:

1. A device for applying liquid fertilizer to soil having in combination a device for breaking the soil, a device for applying liquid fertilizer to the broken soil and means for covering the fertilizer immediately after it is applied to the soil, said means for breaking the soil and for covering the fertilizer being positioned to substantially enclose said means for applying liquid fertilizer to the soil whereby the escape of volatile constituents of the fertilizer is prevented.

2. A device for applying liquid fertilizer to soil having in combination a frame, means carried by the frame for breaking the soil, a tank for liquid fertilizer carried by the frame, a conduit conducting liquid fertilizer from said tank to the broken soil, a discharge nozzle through which liquid fertilizer from said conduit is passed, a valve connected to said conduit for controlling the discharge of fertilizer onto the soil, means actuated by movement of the frame over the soil to operate said valve, and means substantially surrounding said discharge nozzle for covering the fertilizer immediately after it is applied to the soil.

3. A device for distributing liquid fertilizer comprising a frame, a tank for the liquid fertilizer carried by the frame, a ground wheel secured to the frame and supporting the same, a conduit for conducting liquid fertilizer from said tank to the soil, and a valve for controlling the discharge of liquid fertilizer from said conduit, said valve being located externally of said conduit and movable with reference thereto and means actuated intermittently by the rotation of said ground wheel to operate said valve and discharge liquid fertilizer from said conduit onto the soil.

4. A device for distributing liquid fertilizer comprising a frame, a tank containing liquid fertilizer carried by said frame, a ground wheel secured to the frame, a pipe leading from said tank, said pipe having a nozzle secured thereto through which the liquid fertilizer is discharged onto the soil, a valve carried by said nozzle and located externally of said conduit and means actuated by rotation of the ground wheel to move said valve with reference to said conduit to discharge liquid fertilizer from said nozzle onto the soil.

5. A device for distributing liquid fertilizer comprising a tank for the liquid fertilizer, a pipe connected to said tank and a nozzle connected to said pipe through which the liquid fertilizer is discharged onto the soil, said nozzle being movable longitudinally of said pipe to discharge liquid fertilizer therefrom.

6. A device for applying aqua-ammonia to soil as a fertilizer comprising a tank for the aqua-ammonia, a frame supporting the tank, a ground wheel carried by said frame and supporting the same, a blade carried by the frame for breaking the soil, a pipe leading from said tank, a nozzle secured to said pipe and positioned to discharge aqua-ammonia onto the broken soil, a member normally closing said pipe to prevent the discharge of fertilizer therefrom, a cam associated with said member and actuated by rotation of said ground wheel to displace said member intermittently and allow aqua-ammonia to flow from said pipe into said nozzle to be discharged evenly over the soil and a covering member secured to said frame for covering the aqua-ammonia immediately after it is applied to the soil, said blade and cover member being positioned to substantially enclose said nozzle and prevent the escape of volatile constituents of said aqua ammonia into the air.

CHRISTOPHER G. ATWATER.